Patented July 8, 1941

2,248,098

UNITED STATES PATENT OFFICE 2,248,098

PROTECTION OF PIPES AND LIKE HOLLOW BODIES

Frederick Benjamin Cornelius, Stanton-by-Dale, and Patrick Pierce Butler Cormac, Blackheath, London, England, assignors to Rubber Cement Products Limited, London, England, a British company No Drawing. Application June 4, 1940, Serial No. 338,742. In Great Britain March 29, 1939

8 Claims. (Cl. 91—68)

This invention relates to the protection of pipes and like hollow bodies by lining them with protective material to preserve them from internal attack by acid or other corrosive fluid conveyed therethrough or from attrition.

The present invention contemplates forming or providing a hollow body such as a pipe, by a centrifugal or spinning method, with an internal lining of a plastic-self-hardening composition formed by mixing aqueous dispersions of rubber with cement or like hardenable dehydrating substance of higher specific gravity than rubber. Compositions of this kind have been described, inter alia, in United States patent specification No. 1,940,528.

The term "rubber" used herein is intended to include not only natural rubber (caoutchouc) but also allied vegetable resins, such as gutta-percha and balata, furthermore synthetic rubbers such as derivatives of butadiene and chloroprene, and rubber reclaim.

According to one method of carrying out the invention, the lining of an already formed pipe of iron or concrete may be effected by spinning said pipe on a substantially horizontal axis and leading the plastic-self-hardening composition in a pasty or fluid state into the interior of the pipe or tube and there discharging it through nozzles or from an axial trough. Methods and apparatus such as those set forth in British patent specifications Nos. 203,937, 315,572 and 461,022 may be utilised for applying said lining.

The centrifugal force imparted to the lining composition by the rotation of the pipe or the like to be lined, tends to cause the heavier constituents of the composition e. g. the cement particles, to segregate nearer to the inner surface of said pipe than the lighter constituents, i. e. the rubber content. Thus the lining, when finally deposited and set, comprises merging strata or layers, that most rich in cement being adjacent to the inner surface of the pipe or the like and that most rich in rubber, forming the inner surface of the lining remote from the inner surface of the pipe. The layer of lining composition adjacent to the inner surface of the pipe or the like being lined, particularly if the body be of concrete or like cementitious material, adheres strongly thereto owing to the preponderance of cement whilst the other layer which is rich in rubber forms the surface of the lining. The centrifugal action on the lining causes peripheral packing of the particles thereof which promotes adhesion to the inner surface of the pipe or the like.

When lining a hollow body centrifugally as hereinbefore described, the charging or filling may take place with the body rotating at an internal peripheral speed of about 330 ft. per minute, the spreading and finishing being effected at higher peripheral speed, e. g. about 990 ft. per minute. Such conditions enable satisfactory compacting and consolidation of the composition to be achieved, without expression of liquid which might be detrimental to the subsequent setting or effectiveness of the applied composition.

In the foregoing lining method, pin or other mechanical anchorages may be provided to assure permanent connection between the pipe or like body and the lining composition; so also may metal or other reinforcements be incorporated if desired.

When lining pre-formed concrete pipes by the hereinbefore described method, it is advantageous to steam-cure such pipes prior to applying the lining composition.

According to another embodiment of the invention, the lining composition may be applied to the interior of the cement pipes during the course of the spinning of said pipes.

The plastic-self-hardening compositions used in carrying out the invention consist of, more specifically, an aqueous dispersion of rubber, plus a relatively substantial, for instance, equivalent, amount of cement, for example Portland or aluminous cement together with the usual fillers, vulcanisers, anti-oxidizing agents and accelerators. Compositions and factors which should be taken into account in their manufacture and use generally, may be as described for example in United States specification No. 1,940,528. As those skilled in the art will readily understand cement as referred to hereinbefore and in the aforesaid patent designates a product which forms a plastic composition with water which hardens with time. Such cement embraces Portland or hydraulic cement.

In order to shorten the spinning period it is preferable to incorporate with the rubber-cement composition a substance such as sand, clay, bentonite or the like filler which will enable a mechanical structure to be built up in the composition while it is still unset.

Example

A lining composition was prepared, which consisted of:

90 lbs. of Leighton Buzzard sand;

30 lbs. of an aqueous dispersion of concentrated rubber latex dispersion known under the registered Trade-Mark "Revertex" and containing vulcanising ingredients and stabilisers and having a final dry solid content of approximately 70%;

30 lbs. of aluminous cement, known under the registered Trade-Mark "Ciment Fondu"; and 10 to 15 ounces of water.

Several 9 inch diameter concrete pipes and several 6 inch by 3 feet spun iron pipes were lined with the aforedescribed lining composition to a thickness of approximately 1/8 inch. The most suitable speeds of rotation of the pipes were found to be those which gave at the surfaces to be treated:

During filling, approximately 330 peripheral feet per minute.

During spreading and finishing, approximately 990 peripheral feet per minute.

In the case of the 9 inch concrete pipe, the spreading and finishing operation took approximately one minute.

In order to assist the even spreading of the mixture, a rod was occasionally passed through the pipes while spinning.

Unlike ordinary concrete mixtures, the lining was not consolidated after spinning, but remained quite soft for some two to three minutes, until chemical reaction leading to the coagulation of the rubber of the lining composition had commenced.

We claim:

1. A method of producing a hollow body having a corrosion-resistant and wear-resistant inner surface comprising merging strata of material of varying richness in a hydraulic cement and in rubber, the stratum richest in said hydraulic cement being adjacent said outer shell and the stratum richest in said rubber being relatively remote from said outer shell and forming the inner corrosion-resistant and wear-resistant surface of said hollow body, which comprises rotating a hollow body at an inner peripheral speed of at least about 330 feet per minute, introducing a mobile, plastic, self-hardening composition containing an aqueous dispersion of rubber and a hydraulic cement of higher specific gravity than said rubber into the interior of said rotating hollow body, continuing to rotate said hollow body at an inner peripheral speed of at least about 330 feet per minute until said self-hardening composition is substantially evenly distributed over the inner surface of said rotating hollow body, increasing the speed of rotation to an inner peripheral speed of about 990 feet per minute, and rotating said hollow body at an inner peripheral speed of about 990 feet per minute until said self-hardening composition is consolidated and compacted and bonded to the inner surface of said hollow body.

2. A process as set forth in claim 1 wherein excess of the mobile, plastic, self-hardening composition is discharged from the interior of the rotating hollow body before the inner peripheral speed reaches 990 feet per minute.

3. A process as set forth in claim 1 wherein the aqueous dispersion of rubber comprises latex and the hydraulic cement of higher specific gravity than rubber comprises Portland cement.

4. A process as set forth in claim 1 wherein the amount of hydraulic cement is substantially equivalent to the amount of rubber.

5. A process as set forth in claim 1 wherein the mobile plastic self-hardening composition contains vulcanizers.

6. A process as set forth in claim 1 wherein the hollow body is a pipe.

7. A process as set forth in claim 1 wherein the hollow body comprises steam-cured, preformed concrete pipe.

8. As a new article of manufacture, a lined hollow body lined with a protective material to preserve said hollow body from internal attack comprising a hollow body and a corrosion-resistant and wear-resistant lining bonded thereto, said lining comprising merging strata of material of varying richness in a hydraulic cement and in rubber, the stratum richest in said hydraulic cement being adjacent said hollow body and the stratum richest in said rubber being relatively remote from said hollow body and forming the inner corrosion-resistant and wear-resistant surface of said lined hollow body, said lined hollow body having a corrosion-resistant and wear-resistant lining having been produced in accordance with the method set forth in claim 1.

FREDERICK BENJAMIN CORNELIUS.
PATRICK PIERCE BUTLER CORMAC.